United States Patent Office 3,808,195
Patented Apr. 30, 1974

3,808,195
PROCESS FOR PREPARING DISPERSIBLE POLY-
GALACTOMANNAN GUM AND DERIVATIVES
Gerald J. Shelso and Barnabas Seaman, Minneapolis,
Minn., assignors to General Mills Chemicals, Inc.
No Drawing. Filed Apr. 14, 1972, Ser. No. 244,267
Int. Cl. C07c 47/18
U.S. Cl. 260—209 R                 10 Claims

ABSTRACT OF THE DISCLOSURE

Process for making dispersible polygalactomannans and derivatives containing low levels of borate ion by incorporating the borate ion into the polymer prior to drying.

This invention relates to a process for making dispersible polygalactomannans. More particularly, this invention relates to a process of incorporating a material containing a borate ion into polygalactomannans or their derivatives in a manner which renders the polygalactomannan or derivative dispersible but causes only limited cross linking when the polygalactomannan is hydrated and the pH of the resulting sol is made alkaline.

The term "polygalactomannan" as used herein includes the general class of polysaccharides containing both galactose and mannose units. The "polygalactomannans" are usually found in the endosperm sections of leguminous seeds such as guar, locust bean, tara, honey bean, flametree and cassia occidentalis. The derivatives of polygalactomannans included in the practice of this invention are the water soluble derivatives such as: carboxyalkyl ethers of the polygalactomannans, for example, carboxymethyl ethers of polygalactomannan, carboxyethyl ether of polygalactomannan; hydroxyalkyl ethers of polygalactomannans such as hydroxyethyl ether of polygalactomannan, hydroxypropyl ether of polygalactomannan; carbamylethyl ether of polygalactomannan; cationic polygalactomannan and depolymerized polygalactomannans.

By the term "a material containing a borate ion" is meant a water soluble material which can contribute a borate ion to the reaction. Among the preferred materials are the alkali metal, alkaline earth metal and ammonium salts of borate anions. The borate anions useful in the practice of this invention include the tetraborate, metaborate and perborate anions. The concentration of borate ion in the following discussion is expressed as borax

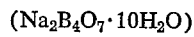
(Na₂B₄O₇·10H₂O)

By the term "disperse" is meant the distributing of polymer particles uniformly throughout an aqueous media. By the term "hydrate" is meant the swelling of the polymer molecules by absorbing water. It is known that the pH ranges at which the polymer particles hydrate are quite broad once the polymer particles are dispersed. The polygalactomannans themselves generally hydrate at pH levels of about 2 to 10 pH. They hydrate most rapidly at pH levels of about 4 to 8 pH. Carboxyethyl ether of polygalactomannan, carbamyl ethyl ether of polygalactomannan and highly substituted hydroxyethyl and hydroxypropyl polygalactomannan hydrate at pH levels of about 2 to 11 pH. In all cases the rate of hydration is greatest at nearly neutral or acidic pH levels.

By the term "no gelling or gelation" is meant that the gum suspension, dispersion or sol is pourable. By the term "first stage gelling or gelation" is meant that the gum suspension, dispersion or sol is no longer pourable but does not have dimensional stability and will spread if unconfined. By the term "second stage gelling or gelation" is meant that the gum suspension or dispersion or sol is not pourable, has some dimensional stability and will temporarily hold a shape and will spread if unconfined for a short period of time.

Polygalactomannans and their water soluble derivatives are very difficult to disperse in water at any pH level. When dispersion is attempted without dispersion aids, it cannot be completed before the surface of the polymer particles hydrate and become sticky. The surface hydration and stickiness occurs before the interior of the polymer particles have hydrated to any significant extent. The surface stickiness causes the polymer particles to clump together into balls composed of particles having hydrated surfaces and substantially unhydrated interiors. Because the polymers generally rehydrate faster under acidic conditions, the problem is particularly severe when dispersion is attempted under acidic conditions. Several approaches have been used in efforts to overcome the problem of balling. One approach is to use very vigorous stirring or agitation to break the balls apart. Such agitation, of course, requires equipment and is inconvenient. Another approach is to preslurry the polymer in a medium in which it does not hydrate and then add that slurry to water. Media which can be used are alcohol and mineral oil. Still another approach is to dry blend borax in the amounts of about 0.75% to 5% by weight of the polymer into the polymer particles prior to dispersion. When the borax-polymer blend is added to water, the borax retards or obviates the development of stickiness on the particles' surfaces presumably by forming a thin film or cross-linked polymer on the surface. The presence of borax in amounts sufficient to retard or obviate stickiness creates a problem when dispersion has been achieved and the polymer is to be hydrated and used as a thickener. The problem arises from the fact that the borate ion is a cross-linking agent for polygalactomannans and their derivatives under alkaline conditions. Basically the occurrence of cross linking by the borate ion is pH dependent but the extent of cross linking is dependent upon pH, the concentration of the borate ion and the concentration of the polygalactomannan. At borate concentrations of about 0.75%, stage 2 gelling of guar occurs at a pH level above 8. In high concentrations and with some polymers cross linking will occur even at lower pH levels. For example, at borax concentrations of about 3% cross linking of guar in concentrations of 1% by weight of the sol occurs at pH levels of about 7.0 pH. At borax concentrations of about 0.5% cross linking of cationic depolymerized guar in concentrations of 12% by weight of the sol can occur at about 7.0 pH. At borax concentration levels (expressed as

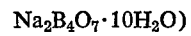
Na₂B₄O₇·10H₂O)

in the range of 0.75% to 5% by weight of the guar, the concentration of the guar being about 1% of the sol, cross linking takes place to such an extent that the guar forms at least stage 2 gels. The derivatives of the polygalactomannan have sufficient tolerances toward the cross-linking effect of the borate ion. A comparison of the cross linking of a 1% guar dispersion by borax at 0.75% concentration and the derivatives is shown in Example I.

It can be readily appreciated that the polygalactomannan in dispersions made from dry blends containing borax in amounts of about 0.75% to 5% cannot be easily used as a thickener for manufacturing formulations wherein the pH level is 8 or above. This is also true under some circumstances at neutral or slightly acid pH levels. At these pH levels heavy cross linking and frequently gelling occurs.

It has now been found that dispersibility of polygalactomannans and their water soluble derivatives can be achieved using materials containing borate ions at concentrations substantially below the borate ion concentrations required in the dry blending technique. Dispersion can be achieved over the pH range of 2 to 14 in aqueous media. Only a minimum of hand stirring of the polymer particles into the water is required to achieve dispersion.

The materials containing borate ions can be used in amounts such that the concentrations of the borate ion expressed as borax ($Na_2B_4O_7 \cdot 10H_2O$) is about 0.1 to 0.5% by weight of the polymer having a moisture level of about 10% by weight. When this amount of cross-linking agent is present, cross linking occurs generally at the same pH levels as it occurs at higher cross-linking agent concentration levels. The extent of cross linking and any accompanying gel formation, however, is such that the dispersion remains fluid under acidic, neutral and slightly alkaline conditions at polygalactomannan concentrations up to about 1% by weight of a sol. Because the sol remains fluid although lightly cross linked, it can be used as a thickener under these pH conditions. Example III shows guar gum, made dispersible by the practice of this invention, which remained fluid at a pH of 8.5. Example VIII shows sol of carboxyethyl ether of locust bean, made dispersible by the practice of this invention, which remained fluid at a pH of 9.2.

Generally, the present invention comprises soaking the polygalactomannan in an alkaline water solution of a material containing borate ions, allowing the polygalactomannan to absorb all of the solution and then milling and drying the polygalactomannan. The amount of solution used is about equal to the amount of polygalactomannan used. The solution is made alkaline with alkali metal or alkaline earth metal hydroxide. The concentration of the alkali metal or alkaline earth metal hydroxide in the solution is about 0.3% to 0.5% by weight of the polygalactomannan. The concentration of the borate ion expressed as borax ($Na_2B_4O_7 \cdot 10H_2O$) is about 0.1% to 0.5% by weight based on the weight of the polygalactomannan, preferably about 0.2% to 0.4%. Generally, the polygalactomannan will absorb the alkaline borate ion solution in about 20 to 90 minutes. After the solution has been absorbed, the polygalactomannan is milled and dried, usually at an air temperature of about 150° C. to 250° C. to about the original moisture level of untreated polygalactomannan. Untreated polygalactomannans usually contain about 9% to 12% water by weight. The polygalactomannan is now in a dispersible form and can be dispersed in water having pH levels of from 2 to 14. The polygalactomannan will then hydrate at the same pH levels as the untreated polymer. In one embodiment of the invention an acid is dry blended into the dry, milled borated polygalactomannan. The equivalence of dry acid used is approximately equal to or in excess of the alkali metal or alkaline earth metal hydroxide and the borate ion in the polygalactomannan. In other words, the amount of dry acid used is sufficient to at least neutralize the alkaline constituents in the polygalactomannans. Typical dry acids which can be used are fumaric, sulfamic and gluconodeltalactone. The incorporation of a dry acid into the blend allows the polymer to hydrate at nearly neutral pH levels. In another embodiment a liquid acid is incorporated into the polygalactomannan prior to drying. The liquid acid partially neutralizes the alkaline constituents. Adding acids to the blend is not essential if the pH of the water in which the borated polygalactomannan is expected to hydrate is adjusted to the desired pH, namely below the expected gelation point.

Dispersible water soluble derivatives of the polygalactomannans can be obtained by the above-described procedure using the derivatives as starting materials. As an alternative method, the derivatives can be made at the same time the polygalactomannan is absorbing the borate ion and the alkali metal or alkaline earth metal hydroxide. Known methods of preparing the derivatives are discussed below. Typical procedures for making the derivatives concurrently with borating the polygalactomannan are shown in Examples IV to VIII. As can readily be appreciated, the specific procedures for making the derivatives shown in the examples are adapted from the general preparation procedures discussed below. The adaptation comprises the addition of a material containing the borate ion to the derivatizing reaction mixture.

Carboxyalkyl ethers of polygalactomannans can be obtained from the derivatizing method set out in U.S. Pat. 2,520,161. These derivatives can be made dispersible by the practice of this invention. The derivative may be made in situ during the borating process. Briefly, the method of forming a dispersible carboxymethyl ether of polygalactomannan concurrently with borating the derivative comprising adding the alkali metal or alkaline earth metal hydroxide, the material containing the borate ion and a haloacetic acid or its alkali metal salts to the polygalactomannan. The halo fatty acid may be added as a salt. After the polygalactomannan has dispersed in the solution, the mixture is heated to a temperature of about 80° to 85° C. for a period of about one to two hours with mixing. The reaction mixture is then cooled and diluted with water and made acidic to phenol-phthalein. The product is then precipitated with a water-miscible organic solvent such as methanol, acetone and the like.

The method of forming a dispersible carboxyethyl ether of polygalactomannan concurrently with borating the derivative comprises substituting acrylonitrile for the halo fatty acid in the above procedure.

Dispersible hydroxyalkyl ethers of polygalactomannan can be prepared in situ in the borating process by adding an alkylene oxide to the polygalactomannan, alkali metal or alkaline earth metal hydroxide and the material containing the borate ion mixture. The resulting mixture is heated and the derivative finally precipitated. The reaction can be conducted at room temperature or elevated temperatures. The temperature range in which the reaction is generally conducted is about 17° C. to 100° C. While higher temperatures can be used, such as up to 125° C., there is generally no advantage achieved. The reaction can be conducted at atmospheric temperature, under reflux, or at elevated pressures, in a closed reactor. The exact pressure is not critical and while higher pressure may be employed, operation is normally conducted at whatever pressure develops during the reaction. Generally such developed pressures will be on the order of from about 30 to 125 p.s.i.g. The hydroxyalkyl ethers of galactomannans can be prepared before hand and subsequently borated. The preparation in that case is conducted in the absence of the material containing borate ion.

The carbamyl polygalactomannans are made by reacting acrylamide with the polygalactomannan in the presence of an alkaline catalyst. Usually alkali metal or alkaline earth metal hydroxides, such as sodium, potassium or calcium hydroxide, can be used. Ammonia may also be used. Lithium hydroxide is the preferred catalyst. The catalysts are usually employed in amounts of about 2% to 3% by weight of the polygalactomannan. The acrylamide is added to the mixture of the polygalactomannan and alkali metal or alkaline earth metal hydroxide. Commonly, the reaction is conducted at temperatures of about room temperature to 40° C. The molar ratio of acrylamide to polygalactomannan in the reaction is about 0.25 to 1.0 and usually about 0.5. The solvent system is ordinarily the same as used in the preparation of hydroxyalkyl polygalactomannans. The derivative can be made in situ in the borating process, by adding the material containing borate ion solution to the reaction mixture.

Cationic polygalactomannans are usually quaternary ammonium ethers. They are usually made by reacting a polygalactomannan gum with a quaternary ammonium compound having the formula:

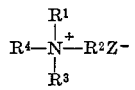

wherein $R^1$, $R^2$ and $R^3$ are the same or different and are alkyl, substituted alkyl, alkenyl, aryl or aralkyl groups, $Z^-$ is an anion and $R^4$ is an epoxy alkyl or halohydrin group. The anion $Z^-$ may, for example, be $Cl^-$, $Br^-$, $I^-$ or $HSO_4^-$. Examples of the group $R^4$ are illustrated by the formulae:

Epoxy alkyl

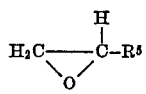

Halohydrin and

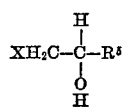

wherein X is a halogen atom and $R^5$ is a divalent alkylene radical having from 1 to 3 carbon atoms. The radical $R^5$ may be straight chained or branched chain, for example. Illustrative of quaternary ammonium compounds which may be employed are 2,3-epoxypropyl trimethylammonium chloride and 3-chloro-2-hydroxypropyl trimethylammonium chloride. In order to prepare the quaternary ammonium polygalactomannan ethers, the quaternary ammonium compound is dissolved in a suitable solvent such as water and added to the polygalactomannan. The reaction occurs at room temperature; however, heat and increased amounts of catalyst increase the reaction rate. In general, temperatures between about 30° C. and 70° C. are used. For this reaction alkali metal hydroxides and alkaline earth metal hydroxides are preferred. These materials, of course, are present in the borate ion absorbing process of the present invention. The derivative can be made in situ in the borating process by adding the quaternary ammonium compound to the reaction mixture.

The depolymerized counterparts of the above polygalactomannas and derivatives can be made by treating the mixture of galactomannan, material, containing borate ion and alkali metal or alkaline earth metal hydroxide with hydrogen peroxide or alkali metal peroxide and mixing the mixture about 40 minutes at about room temperature. The hydrogen or alkali metal peroxide attacks the glycosidic linkages of the polygalactomannan chain breaking the very long chains into shorter chains. The shorter chains of the depolymerized galactomannans develop less viscosity in dispersions than the longer chains of the initial gum.

The water soluble derivatives prepared as described above can be rendered dispersible by the same procedure as the underivatized polygalactomannan. Specific examples of incorporating the borate ion into polygalactomannas and making their water soluble derivatives concurrently with borating the polygalactomannan are set out below. Assuming the molecular weight of galactomannan unit as 200, the substituting groups are in a 0.1 molar to 3 molar ratio in the reaction mixtures producing molar substitutions of at least 0.1. The molar substitution is the average number of substituting radical substituted per mole of anhydrohexose unit of polygalactomannan gum. The examples are illustrative of specific procedures and do not represent limitations of the invention.

EXAMPLE I

This example illustrates the relative tolerance of guar gum and its derivative to the cross linking effect of the borate ion.

A series of dispersions were made containing guar or its derivatives in concentrations shown in Table 1. Borax in the amount of 0.75% of the gum was added to the first series and guar in amounts of 5.0% by weight of the gum were added to the second series and the sols made alkaline with sodium hydroxide. The extent of cross linking was measured one hour after the alkali addition. For the measurement a grease penetrometer equipped with an aluminum cone weighing 34.7 grams and standard stainless steel cone weighing 102.1 grams was used. The cones were inverted from their normal position when measuring grease. The exterior surface of the apex of the cone was attached to the arm of the penetrometer so that the periphery of the base of the cone contacted the cross-linked sol first. In this position the cone was allowed to free fall or sink into the sol for a period of five seconds. The distance of penetration was measured in 0.10 mm. units. The results are shown in Table 1.

TABLE 1
Relative tolerance to borate ion

| Gum | Gum concentration in sol, percent | 0.75% added borax ($Na_2B_4O_7 \cdot 10H_2O$) | | | | 5% added borax ($Na_2B_4O \cdot 10H_2O$) | | | |
|---|---|---|---|---|---|---|---|---|---|
| | | Viscosity of sol before borax added | pH of dispersion with borax | Aluminum cone penetration 1/10, mm. | Steel cone penetration 1/10, mm. | Viscosity of sol before borax added | pH of dispersion with borax | Aluminum cone penetration 1/10, mm. | Steel cone penetration 1/10, mm. |
| Guar gum | 1 | 4,275 | 10.6 | 44 | 140 | 3,900 | 9.3 | 13 | 30 |
| Locust bean gum | 1 | 3,125 | 10.4 | 55 | 173 | 3,200 | 9.6 | 24 | 58 |
| 2,3-epoxypropyltrimethyl guar | 1 | 1,700 | 10.0 | 92 | 165 | 1,800 | 9.0 | 23 | 52 |
| Carboxyethyl locust bean gum | 1 | 725 | 10.1 | 438+ | 438+ | 750 | 9.0 | 438+ | 438+ |
| Carboxyethyl guar | 1 | 2,000 | 10.6 | 410 | 438+ | 2,075 | 9.1 | 231 | 438+ |
| Carboxymethyl guar | 1 | 190 | 10.5 | 438+ | 438+ | (¹) | (¹) | (¹) | (¹) |
| Do | 2 | 2,225 | 10.1 | 93 | 270 | 2,300 | 8.7 | 195 | 438+ |
| Carbamylethyl guar | 1 | 650 | 10.4 | 406 | 438+ | 900 | 9.2 | 44 | 119 |
| Hydroxyethyl guar | 1 | 2,200 | 10.7 | 105 | 323 | 2,400 | 9.7 | 26 | 52 |
| Hydroxypropyl guar | 1 | 3,200 | 10.6 | 85 | 296 | 3,325 | 9.3 | 37 | 91 |

¹ Measurement not taken.

The data show that the derivatives of guar are more resistant to cross linking with the borate ion than guar itself. They also show that there are differences between derivatives.

EXAMPLE II

This example illustrates the effect upon guar gum sols of added borax, changes in the pH level and the gum concentration.

In the first series, guar gum was blended with borax in the amounts shown in Table 2. Five grams of each of the guar gum-borax blends were dispersed in 495 grams of water and the pH of the resulting dispersions adjusted to 6.8. After a period of four hours the pH of the hydrated dispersions was increased to 11.4 by the addition of five milliliters of a 10% (wt./vol.) trisodium phosphate solution to each sample. With the increase in pH, cross linking occurred. The penetrability of the gel was measured in the same manner as described in Example I. The results are shown in Table 2.

TABLE 2
Effect of borax concentration

| Percent borax ($Na_2B_4O_7 \cdot 10H_2O$) by wt. of guar | Penetration in 1/10 mm. | |
|---|---|---|
| | Aluminum cone | Stainless steel cone |
| 0.20 | 119 | 438+ |
| 0.30 | 72 | 258 |
| 0.50 | 41 | 101 |
| 0.75 | 28 | 58 |
| 1.50 | 31 | 36 |
| 2.50 | 25 | 34 |
| 5.00 | 20 | 34 |

As can readily be seen from the depths of penetration shown in Table 2, at between about 0.5% and 0.75% borax by weight, the sol has become sufficiently firm that the changes in depth of penetration as compared to the changes in borax concentration are small. In other words, the extent of cross linking was such that the sol was becoming firm rather than merely thick at borax concentrations above 0.50%. The dispersion at borax concentration of 0.2% were in the stage of no gelling.

In the second series, guar gum was blended with 0.5% borax by weight of the guar gum. Five gram samples of the guar gum-borax blends were dispersed in 495 grams of water. The pH of the dispersions was 6.8. The samples were allowed to hydrate for a period of about four to five hours. After hydration a 10% (wt./vol.) trisodium phosphate solution, in amounts shown in Table 3, was added to the samples. One hour after addition of the alkali, the extent of cross linking was measured as described above. The extent of penetration is shown in Table 3.

TABLE 3
Effect of pH level

| Trisodium phosphate 10% sol (wt./vol.), ml. | pH of sol | Penetration in 1/10 mm. | |
|---|---|---|---|
| | | Aluminum cone | Stainless steel cone |
| 0.2 | 7.7 | 282 | 438+ |
| 0.5 | 8.5 | 188 | 438+ |
| 1.0 | 9.2 | 107 | 438 |
| 2.0 | 10.2 | 54 | 158 |
| 5.0 | 11.4 | 37 | 88 |

As can be seen from the above data, a substantial decrease in the degree of penetration occurred between pHs of 9.2 and 10.2. In other words, the extent of cross linking was such that the sol was becoming firm rather than merely thick.

In the third series, guar gum was blended with 5% borax by weight of the gum. Dispersions were then made using concentrations of the gum-borax blend shown in Table 4. The pH of the dispersions was then adjusted to a pH of 11.3 to 11.5 with trisodium phosphate. The penetrability of the resulting dispersions was then measured by the method described in Example I. The results are shown in Table 4.

TABLE 4
Effect of gum concentration

| Percent by wt. gum-borax blend | Viscosity of sol before pH adjustment | Penetrability of sols | |
|---|---|---|---|
| | | Aluminum 1/10 mm. | Steel cone 1/10 mm. |
| 0.25 | 35 | 438+ | 438+ |
| 0.50 | 350 | 153 | 438+ |
| 0.75 | 1,550 | 54 | 92 |
| 1.00 | 3,700 | 33 | 55 |

Only a concentration of 0.25% produced a no-gelling situation. The 0.50% concentration produced a stage 1 gelation. Above 0.50% concentration stage 2 gelation occurred.

The data shown in Tables 2 and 3 indicate that at borax concentrations below about 0.5% the sols retained their fluidity over a greater pH range than at borax concentrations above about 0.5%. The data in Table 4 show the increased tendency to gel as the concentration of the gum increases.

EXAMPLE III

This example illustrates the incorporation of borax and sodium hydroxide into guar gum to produce dispersible guar by the practice of this invention. Data are also shown comparing the extent of cross linking occurring at a pH level of 8.5 with a typical guar gum dry blended with sufficient borax to render it dispersible and the extent of cross linking occurring at the same pH with the dispersible guar gum of this invention.

For making dispersible guar according to the teachings of this invention, the reaction constituents were used in the following amounts:

| Constituents: | Amount (grams) |
|---|---|
| Dehulled guar | 100.0 |
| Borax | 0.2 |
| Sodium hydroxide | 0.5 |
| Polypropylene glycol * | 0.6 |
| Water | 100.0 |
| Fumaric acid | 0.75 |
| | 202.05 |

*To minimize dust.

The dehulled guar was soaked in a water solution of the sodium hydroxide, polypropylene glycol and borax for a period of about one and one-half hours. The reaction mixture was then dried and milled. The fumaric acid was then dry blended into the reaction mixture.

A typically dispersible borax and guar gum mixture was prepared by dry blending guar, which had been tempered in a sodium hydroxide solution and then dried, milled and blended, with borax in amounts of 2.2% by weight of the mixture.

The two samples prepared as described above were added to water in amounts to produce a 1% sol. Both samples dispersed readily when stirred into the water. After dispersion and hydration, the pH of the sols was adjusted to 8.5. A comparison of the dispersion properties, hydration properties and pH effect are shown in Table 5. Viscosities before pH adjustment were measured with a Brookfield viscometer using a No. 3 spindle rotating at 20 r.p.m. After pH adjustment the viscosity of the in situ product was measured using a No. 5 spindle rotating at 20 r.p.m. and the dry blended material was measured using a No. 7 spindle rotating at 20 r.p.m.

TABLE 5

| Sample | Viscosity, cps., after— | | After pH adjustment | Viscosity of cross-linked material, cps. |
|---|---|---|---|---|
| | 15 min. | 30 min. | pH to 8.5 | |
| Guar containing in situ borax. | 2,600 | 3,025 | 6.0 | Thin gel | 4,000 |
| Guar containing dry blended borax. | 1,000 | 1,200 | 4.5 | Very strong gel. | 76,000 |

The data show that at an 8.5 pH cross linking had occurred in both samples but that the guar containing in situ borax was a stage 1 gel which still had thickening properties while the guar containing dry blended borax had become a stage 2 gel with no thickening properties.

EXAMPLE IV

Dispersible carboxyethyl guar

This example illustrates the incorporation of borax and calcium hydroxide into dehulled guar, the substitution of nitrile groups onto the guar chain and hydrolyzing the substituted nitrile groups to carboxyalkyl groups to form a dispersible carboxyethyl ether of guar.

The reaction constituents were used in the following amounts:

| Constituents: | Amounts (grams) |
|---|---|
| Dehulled guar | 300.00 |
| Calcium hydroxide | 27.79 |
| Borax | 0.90 |
| Water | 250.00 |
| Acrylonitrile | 41.00 |
| Mineral oil * | 0.90 |
| | 620.59 |

*To minimize dust.

The dehulled guar, calcium hydroxide and borax were placed in a reaction mixture and dry blended for a period of about five minutes. The water was then added and mixing was continued while the acrylonitrile was added. Mixing was then stopped. The reactor was purged twice with nitrogen gas. The pressure in the reactor was raised to 2 p.s.i.g. and the reactor was sealed. The reaction mixture was heated gently for a period of approximately 30 minutes. At the end of that time the temperature of the reaction mixture was about 40° C. to 50° C. The reaction mixture was then heated at a temperature of 85° C. for a period of about three hours. The reaction mixture was then cooled, dried and milled.

Fumaric acid in an amount of 3% by weight of the reaction mixture was dry blended into the ground reaction mixture. The fumaric acid-reaction mixture blend was added to water in an amount to make a 2% polymer sol by weight to demonstrate its dispersibility. The polymer particles dispersed in the water with slow mechanical mixing. After a period of three hours of mechanical stirring using medium speed, the viscosity of the sol was 64 centipoise as measured with a Brookfield viscometer using a No. 3 spindle rotating at 20 r.p.m. The pH of the sol at that time was 6.8. Normally, carboxymethyl guar does not hydrate in the presence of calcium hydroxide. Although hydration was slow, taking about 24 hours to complete, the above polymer did hydrate.

EXAMPLE V

Dispersible depolymerized carboxymethyl guar

This example illustrates the incorporation of borax and sodium hydroxide into dehulled guar, the substitution of halo fatty acids onto the guar chain and the depolymerization of the guar chain to form a dispersible carboxymethyl ether of guar.

The reaction constituents were used in the following amounts:

| Constituents: | Amount (grams) |
| --- | --- |
| Guar flour | 200.00 |
| Sodium monochloroacetate | 23.32 |
| Sodium hydroxide | 10.52 |
| Borax | 0.40 |
| 30% hydrogen peroxide | 5.44 |
| Water | 112.40 |
| o-Phenylphenol sodium salt tetrahydrate (Dowicide A, Dow Chemical Co.)* | 3.32 |

*Preservative.

The sodium monochloroacetate, borax and guar flour were placed in the reaction mixer and dry blended for a period of ten minutes. The sodium hydroxide was dissolved in abount 106 grams of water and the solution added to the dry blended ingredients. The resulting mixture was mixed for five minutes. The hydrogen peroxide was then added followed by the remainder of the water to rinse the sides of the reactor. The reactor was sealed and purged with nitrogen. The reaction mixture was then heated to a temperature of 85° C.±5° C. over a period of 20 to 30 minutes. The mixture was then cooled to 50° C. The reactor was unsealed, the preservative was added and the reaction mixture cooled to room temperature. The mixture was then milled and dried.

Fumaric acid in an amount of 3% by weight of the reaction mixture was dry blended into the ground reaction mixture. The fumaric acid-reaction mixture blend was added to water in amounts to make a 2% polymer sol by weight to demonstrate its dispersibility. The polymer particles dispersed in the water with slow mechanical mixing in two minutes forty-five seconds. After a period of 15 minutes of mechanical stirring using medium speed, the viscosity of the sol as measured by a Brookfield voscometer using a No. 3 spindle rotating at 20 r.p.m. was 6650 centipoise. After two hours the pH of the sol was 4.7 and the viscosity 6800 centipoise.

EXAMPLE VI

Dispersible carboxyethyl guar

This example illustrates the incorporation of borax and potassium hydroxide into dehulled guar, the substitution of nitrile groups onto the guar chain, hydrolyzing the nitrile groups to carboxyl groups and incorporating an acid into the reaction mixture prior to drying and milling.

The reaction constituents were used in the following amounts:

| Constituents: | Amount (grams) |
| --- | --- |
| Dehulled guar | 300.00 |
| Potassium hydroxide | 42.00 |
| Acrylonitrile | 41.00 |
| Borax | 0.60 |
| Water | 250.00 |
| Glacial acetic acid | 17.60 |
| Mineral oil* | 0.90 |

*To minimize dust.

The dehulled guar, potassium hydroxide and borax were placed in a reactor mixer. The reactor was evacuated to a pressure of 25″ Hg purged with nitrogen and evacuated again. The water was sucked into the reactor and the reaction mixture was allowed to cool. The acrylonitrile was sucked into the reactor and the pressure in the reactor raised to 2 p.s.i.g. with nitrogen. The reaction mixture was heated for about 20 minutes to a temperature of about 60° C. The temperature was then raised to 100° C. for a period of 40 minutes. The reaction mixture was subsequently cooled to a temperature of 40° C. as quickly as possible. After cooling, the reactor was unsealed and the glacial acetic acid and mineral oil were added. The mixture was dried and milled.

The mixture was aded to water in amounts to make a 1% sol by the weight to demonstrate its dispersibility. The polymer particles dispersed in the water with slow mechanical mixing in one minute ten seconds. After a period of 15 minutes the viscosity of the sol was 2150 centipoise as measured with a Brookfield viscometer using a No. 3 spindle rotating at 20 r.p.m. After two hours the viscosity was 2225 centipoise and the pH 5.8.

EXAMPLE VII

Dispersible carbamyl guar

This example illustrates the incorporation of borax and lithium hydroxide into dehulled guar and the substitution of amide groups onto the guar chain to form dispersible carbamyl guar.

The reaction constituents were used in the following amounts:

| Constituents: | Amount (grams) |
| --- | --- |
| Dehulled guar | 300.00 |
| Borax | 0.60 |
| Water | 300.00 |
| Acrylamide | 106.60 |
| $LiOH \cdot H_2O$ | 6.00 |
| Mineral oil | 0.90 |

The dehulled guar, borax, lithium hydroxide and 125 grams of water were placed in a reactor mixer. The reaction mixture was mixed and cooled for a period of ten minutes at a temperature of about 25° C. The acrylamide was dissolved in the remainder of the water and added to the reactor. The reactor was then sealed and purged with nitrogen. The reaction mixture was heated to a temperature of 35° C. for three to four hours. The mineral oil was added and mixed into the reaction mixture. The reaction mixture was then dried and milled.

Fumaric acid in an amount of 0.8% by weight of the reaction mixture was dry blended into the ground reaction mixture. The fumaric acid-reaction mixture blend was added to water in amounts to make a 1% polymer sol by weight. The polymer particles dispersed in the water with slow mechanical mixing in one minute thirty-seven seconds. After a period of 15 minutes the viscosity of the sol was 520 centipoise as measured with a Brookfield viscometer using a No. 3 spindle rotating at 20 r.p.m.

After two hours the viscosity was 1425 centipoise and the pH 5.5.

EXAMPLE VIII

Dispersible carboxyethyl locust bean

This example illustrates the incorporation of borax and sodium hydroxide into locust bean gum, the substitution of nitrile groups onto the locust bean chain and hydrolyzing the substituted nitrile groups to carboxyalkyl groups to form a dispersible carboxyethyl ether of locust bean.

The reaction constituents were used in the following amounts:

| Constituents: | Amount (grams) |
|---|---|
| Dehulled locust bean | 300.0 |
| Sodium hydroxide | 24.0 |
| Borax | 0.6 |
| Water | 250.0 |
| Acrylonitrile | 41.0 |
| Glacial acetic acid | 10.0 |
| Mineral oil | 0.9 |

The dehulled locust bean, sodium hydroxide and borax were placed in a reaction mixer and dry blended for a period of about five minutes. The water was then added and mixing was continued while the acrylonitrile was added. Mixing was then stopped. The reactor was purged with nitrogen gas. The pressure in the reactor was raised to 2 p.s.i.g. and the reactor was sealed. The reaction mixture was heated gently for a period of approximately 30 minutes. At the end of that time the temperature of the reaction raised to about 89° C. The reaction mixture was then cooled to 45° C. and the glacial acetic acid was blended into the mixture. Cooling was continued and at the temperature of 40° C. the mineral oil was added and blended into the mixture. The reaction mixture was then dried and ground.

The above reaction mixture was added to water in amounts to make a 1% polymer sol by weight to demonstrate its dispersibility. The polymer particles dispersed in the water with slow mixing in two minutes and forty-three seconds. After a period of three hours of mechanical stirring using medium speed, the viscosity of the sol was 750 centipoise as measured with a Brookfield viscometer using a No. 3 spindle rotating at 20 r.p.m. The pH of the sol at that time was 9.2.

The embodimentns of the invention in which an exclusive property or privilege is claimed are defined as follows:

1. A process for rendering polygalactomannans and their water soluble derivatives dispersible which consists essentially of:
   soaking a gum selected from polygalactomannans or their water soluble derivatives selected from the group consisting of carboxyalkyl ether of polygalactomannan, hydroxyalkyl ether of polygalactomannan, carbyl ether of polygalactomannan, quaternary ammonium ether of polygalactomannan and depolymerized polygalactomannan in an alkaline water solution of a material containing borate ion selected from alkali metal, alkaline earth metal or ammonium salts of tetraborate, metaborate or perborate anions,
   allowing the polygalactomannan to absorb about its own weight of the solution,
   milling the mixture, and
   drying the mixture to the approximate moisture level of untreated polygalactomannan,
   said alkaline water solution of a material containing borate ion, comprising a hydroxide selected from alkali metal or alkaline earth metal hydroxides in concentrations of about 0.3% to 0.5% by weight of the gum and a material containing borate ion expressed as borax ($Na_2B_4O_7 \cdot 10H_2O$) in concentrations of about 0.1% to 0.5% by weight of the gum.

2. The process of claim 1 wherein the material containing borate ion is in concentrations of about 0.2 to 0.4%.

3. The process of claim 1 wherein the gum is guar.

4. The process of claim 1 wherein the material containing borate ion is borax.

5. The process of claim 1 wherein the alkaline, material containing borate ion-polygalactomannan mixture includes a haloacetic acid or salt and wherein the mixture is heated to a temperature of about 80° to 85° C. thereby producing a dispersible carboxymethyl ether of said polygalactomannan.

6. The process of claim 1 wherein the alkaline, material containing borate ion-polygalactomannan mixture includes acrylonitrile and wherein the mixture is heated to a temperature of about 80° to 85° C. thereby producing a dispersible carboxyethyl ether of said polygalactomannan.

7. The process of claim 1 wherein the alkaline, material containing borate ion-polygalactomannan mixture includes an alkylene oxide and wherein said mixture is held at a temperature of about 17° to 125° C. thereby producing a dispersible hydroxyalkyl ether of polygalactomannan.

8. The process of claim 1 wherein the alkaline, material containing borate ion-polygalactomannan mixture includes acrylamide and wherein said mixture is held at a temperature of about 17° to 125° C. thereby producing dispersible carbamylethyl polygalactomannan.

9. The process of claim 1 wherein the alkaline, material containing borate ion-polygalactomannan mixture includes a quaternary ammonium compound having the formula:

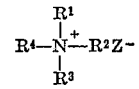

wherein $R^1$, $R^2$, $R^3$ are the same or different and selected from alkyl, substituted alkyl, alkenyl, aryl or aralkyl groups, $Z^-$ is an anion selected from $Cl^-$, $Br^-$, $I^-$ or $HSO_4^-$ and wherein said mixture is held at a temperature of from room temperature to 70° C. thereby producing dispersible cationic polygalactomannans.

10. The process of claim 1 wherein the alkaline, material containing borate ion-gum mixture includes a peroxide selected from hydrogen peroxide or alkali metal peroxides thereby producing depolymerization of the gum.

References Cited

UNITED STATES PATENTS

| | | | |
|---|---|---|---|
| 3,396,034 | 8/1968 | Blondheim et al. | 260—209 R |
| 3,467,647 | 9/1969 | Benninga | 260—209 R |
| 3,679,658 | 7/1972 | Yueh et al. | 260—209 R |

JOHNNIE R. BROWN, Primary Examiner

UNITED STATES PATENT OFFICE
CERTIFICATE OF CORRECTION

PO-1050
(5/69)

Patent No. 3,808,195    Dated April 30, 1974

Inventor(s) Gerald J. Shelso and Barnabas Seaman

It is certified that error appears in the above-identified patent and that said Letters Patent are hereby corrected as shown below:

Col. 1, lines 32 & 33 "of the polygalactomannans" should read
-- of polygalactomannans --
Col. 2, line 28 "film or cross-linked" should read
-- film of cross-linked --
line 55 "sufficient" should read -- different --
line 64 "acid" should read -- acidic --
Col. 4, line 11 "comprising" should read -- comprises --
Col. 6, line 3 "derivative" should read -- derivatives --
line 25 "5% added borax ($Na_2B_4O \cdot 10H_2O$)" should read
-- 5% added borax ($Na_2B_4O_7 \cdot 10H_2O$) --
Col. 7, line 59 "in" should read -- on --
line 62 "in" should read -- on --
Col. 9, line 46 "abount" should read -- about --
lines 65 & 66 "voscometer" should read -- viscometer --
Col. 10, line 30 "aded" should read -- added --
line 31 "by the weight" should read -- by weight --
Col. 11, line 47 "embodimentns" should read -- embodiments --
line 57 "carbyl" should read "carbamyl --
Col. 12, lines 23 & 24 "in cludes" should read -- in-cludes --

Signed and sealed this 17th day of September 1974.

(SEAL)
Attest:

McCOY M. GIBSON JR.
Attesting Officer

C. MARSHALL DANN
Commissioner of Patents